(12) United States Patent
Marvit

(10) Patent No.: US 8,630,854 B2
(45) Date of Patent: Jan. 14, 2014

(54) SYSTEM AND METHOD FOR GENERATING VIDEOCONFERENCE TRANSCRIPTIONS

(75) Inventor: David L. Marvit, San Francisco, CA (US)

(73) Assignee: Fujitsu Limited, Kawasaki-shi (JP)

( * ) Notice: Subject to any disclaimer, the term of this patent is extended or adjusted under 35 U.S.C. 154(b) by 661 days.

(21) Appl. No.: 12/872,268

(22) Filed: Aug. 31, 2010

(65) Prior Publication Data
US 2012/0053936 A1    Mar. 1, 2012

(51) Int. Cl.
*G10L 17/00* (2013.01)
*H04N 7/14* (2006.01)

(52) U.S. Cl.
USPC .................................. 704/246; 348/14.08

(58) Field of Classification Search
USPC .................. 348/14.08–14.09; 704/246–250
See application file for complete search history.

(56) References Cited

U.S. PATENT DOCUMENTS

| | | | |
|---|---|---|---|
| 5,710,591 A * | 1/1998 | Bruno et al. | 348/14.09 |
| 6,377,995 B2 * | 4/2002 | Agraharam et al. | 709/231 |
| 7,046,779 B2 | 5/2006 | Hesse | |
| 7,099,448 B1 * | 8/2006 | Laniepce et al. | 379/202.01 |
| 7,113,201 B1 * | 9/2006 | Taylor et al. | 348/14.08 |
| 7,185,054 B1 | 2/2007 | Ludwig et al. | |
| 7,953,219 B2 | 5/2011 | Freedman | |
| 7,970,115 B1 * | 6/2011 | Coughlan et al. | 379/202.01 |
| 8,219,404 B2 | 7/2012 | Weinberg | |
| 2003/0081751 A1 * | 5/2003 | Berstis | 379/202.01 |
| 2003/0125954 A1 * | 7/2003 | Bradley et al. | 704/270 |
| 2003/0169330 A1 * | 9/2003 | Ben-Shachar et al. | 348/14.09 |
| 2004/0021765 A1 | 2/2004 | Kubala et al. | |
| 2004/0039464 A1 | 2/2004 | Virolainen et al. | |
| 2004/0083104 A1 * | 4/2004 | Liu et al. | 704/256 |
| 2006/0055771 A1 | 3/2006 | Kies | |
| 2007/0136671 A1 | 6/2007 | Buhrke | |
| 2007/0188599 A1 * | 8/2007 | Kenoyer | 348/14.08 |
| 2009/0048939 A1 | 2/2009 | Williams | |
| 2009/0232032 A1 * | 9/2009 | Kelley | 370/261 |
| 2010/0085415 A1 * | 4/2010 | Rahman | 348/14.08 |
| 2010/0199189 A1 | 8/2010 | Ben-Aroya et al. | |
| 2011/0093266 A1 | 4/2011 | Tham | |
| 2011/0096135 A1 | 4/2011 | Hedge et al. | |
| 2011/0217021 A1 | 9/2011 | Dubin et al. | |
| 2011/0279636 A1 | 11/2011 | Anand et al. | |
| 2012/0051719 A1 | 3/2012 | Marvit | |

OTHER PUBLICATIONS

Gail Jenson, "Video Conferencing with Archival Notes," U.S. Appl. No. 12/012,044, 26 pages, filed Jan. 30, 2008.
Thomas H. Hess et al., "Systems and Methods for Conferencing Among Governed and External Participants," U.S. Appl. No. 11/005,545, 85 pages, filed Dec. 6, 2004.

(Continued)

*Primary Examiner* — Samuel G Neway
(74) *Attorney, Agent, or Firm* — Baker Botts L.L.P.

(57) ABSTRACT

A method for generating a transcription of a videoconference includes matching human speech of a videoconference to writable symbols. The human speech is encoded in audio data of the videoconference. The writable symbols are parsed into a plurality of statements. For each statement of the plurality of statements, user profile data stored in computer-readable memory is used to determine which participant of a plurality of participants of the videoconference is most likely the source of the statement. A transcription of the videoconference is generated that identifies for each statement the determination of which participant of the plurality of participants of the videoconference is most likely the source of the statement.

20 Claims, 2 Drawing Sheets

(56) References Cited

OTHER PUBLICATIONS

Risto Kurki-Suonio et al., A Method , A System and A Device for Converting Speech, U.S. Appl. No. 12/298,697, filed May 28, 2009.

Michael A. Barasch et al., "Method and System for Providing Web Based Interactive Lessons with Improved Session Playback," U.S. Appl. No. 12/569,664, 159 pages, filed Sep. 29, 2009.

* cited by examiner

SYSTEM AND METHOD FOR GENERATING VIDEOCONFERENCE TRANSCRIPTIONS

TECHNICAL FIELD

This invention relates generally to the field of communications and more specifically to a system and method for generating videoconference transcriptions.

BACKGROUND

Various videoconference (also known as a video teleconference) technologies exist that enable participants to interact simultaneously via video and audio transmissions. A videoconference may consist of a conversation between two people in private offices (point-to-point) or may involve multiple participants at various sites (multi-point). In addition to audio and visual transmission of various meeting activities, videoconferencing can be used to share documents, computer-displayed information, and whiteboards.

SUMMARY OF THE DISCLOSURE

According to one embodiment, a method for generating a transcription of a videoconference includes matching human speech of a videoconference to writable symbols. The human speech is encoded in audio data of the videoconference. The writable symbols are parsed into a plurality of statements. For each statement of the plurality of statements, user profile data stored in computer-readable memory is used to determine which participant of a plurality of participants of the videoconference is most likely the source of the statement. A transcription of the videoconference is generated that identifies for each statement the determination of which participant of the plurality of participants of the videoconference is most likely the source of the statement.

Certain embodiments of the invention may provide one or more technical advantages. A technical advantage of one embodiment may be that the generation of searchable videoconference transcriptions may be fully automated or semiautonomous. Particular embodiments may include logic configured to determine which participant of a videoconference made a statement during the videoconference using user profile and/or other data associated with the participant. Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
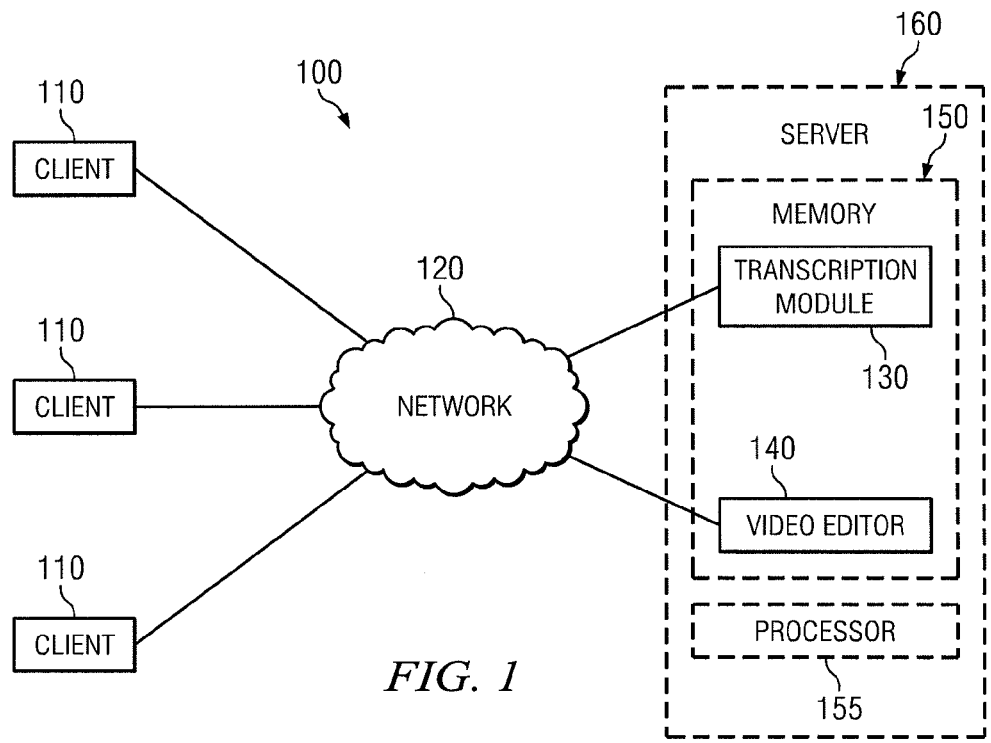
FIG. 1 illustrates a portion of a communication system according to one embodiment.
Figure 2:
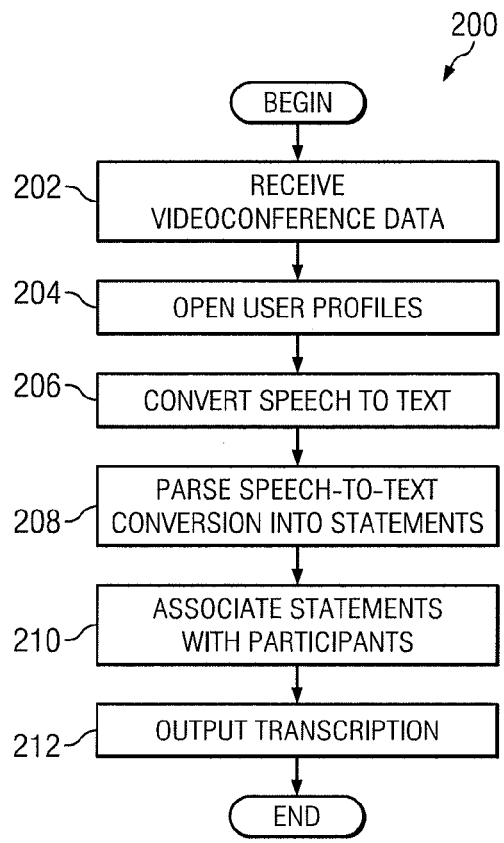
FIG. 2 is a flowchart illustrating a method for generating a transcription of a videoconference according to one embodiment.

Embodiments of the present invention and its advantages are best understood by referring to FIGS. 1 and 2 of the drawings, like numerals being used for like and corresponding parts of the various drawings.

FIG. 1 illustrates a portion of a communication system 100 according to one embodiment. Communication system 100 generally includes multiple clients 110 communicatively coupled to a network 120. In certain embodiments, clients 110 and network 120 may cooperate together to enable one or more users to participate in a videoconference. Particular embodiments may include logic that facilitates recording information captured during videoconferences. For example, a transcription module 130 may be configured to generate speech-to-text transcriptions that identify various statements made during a videoconference in terms of both what was said and who most likely said it. As another example, a video editor 140 may be configured to generate an archival audio-video data stream of a videoconference that switches between the differing viewing perspectives of multiple video data streams recorded during the videoconference.

Clients 110 may include devices that end users or other devices may use to initiate or participate in a videoconference. For example, clients 110 may include a computer, a personal digital assistant (PDA), a laptop, an electronic notebook, a telephone, a mobile station, an audio IP phone, a video phone appliance, a personal computer (PC) based video phone, a streaming client, or any other device, component, element, or object capable of engaging in voice, video, and/or data exchanges within videoconference system 100.

Clients 110 may include a suitable interface to a human user. For example, clients 110 may include a microphone, a video camera, a display, a keyboard, a whiteboard, any combination of the preceding, or other terminal equipment that may provide a videoconferencing interface. Various client 110 interfaces may be configured to capture various forms of data of a videoconference and communicate the captured data to network 120 in the form of a data stream. Data, as used herein in this document, refers to any type of numeric, voice and audio, video, audio-visual, or script data, or any type of source or object code, any combination of the preceding, or any other suitable information in any appropriate format that may be communicated from one point to another.

In particular embodiments, client 110 interfaces may enable a user who did not actively participate in a videoconference to review an edited audio-visual recording of the videoconference. For example, client 110 interfaces may enable a non-participating user to watch an edited version of a videoconference while the videoconference is in progress and system 100 edits data in real-time. Under this scenario, system 100 may broadcast to one or more clients 110 a live or near-live recording of the videoconference edited by system 100. Alternatively, client 110 interfaces may enable a non-participating user to watch an edited version of a videoconference after the videoconference has terminated and system 100 has effected all data processing.

Network 120 may comprise any wireless network, wireline network, or combination of wireless and wireline networks capable of supporting communication of data. For example, network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. In a particular embodiment, network 120 may include a centralized system capable of supporting videoconferencing by receiving media streams from particular clients 110 connected to the same videoconference session, mixing the streams, and sending individual streams back to those clients 110.

Transcription module 130 may include any suitable logic configured to generate speech-to-text transcriptions of videoconferences. Certain speech-to-text transcriptions generated by transcription module 130 may identify one or more respective participants as the likely source of various statements made during the videoconference, as explained further below with reference to FIG. 2. In certain embodiments, the operations of transcription module 130 may be performed using any suitable logic comprising software, hardware, and/or other logic.

Video editor 140 may be configured to generate an archival audio-video data stream of a videoconference. In certain embodiments, video editor 140 may use a variety of rules to switch between the differing viewing perspectives of multiple video data streams recorded during the videoconference, as explained further below with reference to FIG. 3. In certain embodiments, at least a portion of the operations of video editor 140 may be performed in real time as a videoconference progresses. In various embodiments, at least a portion of the operations of video editor 140 may be performed after the videoconference has concluded. In particular embodiments, the operations of video editor 130 may be performed using any suitable logic comprising software, hardware, and/or other logic.

In certain embodiments, transcription module 130 and/or video editor 140 may include logic stored in computer-readable memory 150. Memory 150 stores information. A memory 150 may comprise one or more tangible, computer-readable, and/or computer-executable storage media. Examples of memory 150 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium. Although FIG. 1 illustrates transcription module 130 and video editor 140 as residing at the same memory 150, in alternative embodiments transcription module 130 and video editor 140 may reside at separate memory 150 with respect to each other. In particular embodiments, transcription module 130 and/or video editor 140 may reside at one or more memory devices 150 accessible to or through one or more servers 160.

Server 160 generally refers to any suitable device capable of communicating with client 110 through network 120. For example, server 160 may be a file server, a domain name server, a proxy server, a web server, an application server, a computer workstation, a handheld device, one or more other devices operable to communicate with client 102, or any combination of the preceding. In some embodiments, server 160 may restrict access only to a private network (e.g. a corporate intranet); or, in some other embodiments, server 160 may publish pages on the World Wide Web. In this example, server 160 generally includes at least memory 150 and one or more processors 155; however, any suitable server(s) 160 may be used. Although FIG. 1 illustrates memory 150 residing within server 160, all or a portion of memory 150 may alternatively reside separate from server 160.

Particular embodiments may be implemented as a software as a service ("SaaS"). For example, a provider may license transcription module 130 and/or video editor 140 to customers as a service on demand, through a subscription model, a "pay-as-you-go" model, and/or through some other payment model. As another example, customers may be granted access to, and/or control of, transcription module 130 and/or to video editor 140 via network 120 for purposes of generating transcriptions of their videoconferences.

FIG. 2 is a flowchart 200 illustrating a method for generating a transcription of a videoconference according to one embodiment. In step 202, data regarding the videoconference is received. For example, transcription module 130 may receive audio data that includes an acoustic encoding of human speech and/or other auditory input captured from the videoconference. As another example, transcription module 130 may receive video data that includes an encoding of images and/or other visual sensory information captured from the videoconference.

In a particular embodiment, data may be received in step 202 in the form of one or more data streams. A data stream may be comprised of a variety of different data types and/or data combinations from various sources. For example, each client 110 facilitating the same videoconference may generate respective audio and visual data streams, thereby providing multiple client-based perspectives. As another example, a data stream may be comprised of a combination of data provided by two or more clients 110 facilitating the videoconference. In certain instances, audio and video data captured by a particular client 110 may be received as separate audio and video data streams, respectively. Alternatively, certain audio and video data captured by a particular client 110 may be received as a combined audio-visual data stream.

In various embodiments, data may be received in real time in step 202 as the data is captured by one or more clients 110 during the videoconference. In alternative embodiments, some or all of the data may be received in step 202 sometime after the videoconference has terminated. For example, data may be uploaded or downloaded in step 202 from computer-readable memory.

In step 204, a user profile is opened for each human participant of the videoconference. In certain embodiments, a user profile may comprise data that uniquely identifies the user. For example, the user profile data may identify the user's voice profile, speech recognition profile, the user's facial features, the user's location in a room or building, the site at which the user is participating in the videoconference, an address (e.g., electronic and/or physical) of a client 110 in use by the user, any combination of the preceding, or other information that may be used to establish a profile that identifies the user from among those participating in the video conference. In certain instances, a user profile may comprise data that is determined prior to a videoconference in which the user is participating, during the videoconference, and/or after the videoconference concludes.

In certain embodiments, the step of opening a user profile may include retrieving, creating and/or modifying the user profile. For example, data captured during the videoconference in step 202, or during a prior videoconference, may be used to create or modify user profile data identifying the user's voice profile and/or the user's facial features. As another example, a user may be asked to state a series of words. The sound of the user's voice in stating those words may then be used to define or redefine a voice profile for the user, which may be recorded as user profile data.

In step 206, human speech of the videoconference is converted into symbolic form. For example, transcription module 130 may use data captured from the videoconference and a set of extract rules to convert human speech into text.

In step 208, at least portions of the converted human speech may be parsed into individual statements. For example, transcription module 130 may make determination that a collection of spoken words or other sounds likely came from a particular sound source or from a collection of sound sources. Based at least in part on this determination, transcription module 130 may logically identify this collection of audio data as a statement.

In step 210, each statement is associated with one or more sound sources of the videoconference. In certain embodiments, the association may be at least partially effected automatically by transcription module 130. For example, transcription module 130 may determine which participant likely spoke the statement by matching human speech of a statement to a voice profile of a particular participant, analyzing video data to determine which participant's facial movement appears to be synchronized with audio data of the statement, determining the source of a data stream corresponding to the statement, any combination of the proceeding, or by any of a variety of other methods including textual and semantic analysis.

In various embodiments, transcription module 130 may determine confidence levels representing the probabilities that one or more participants are the sources of a particular statement. Transcription module 130 may set an alert and/or perform additional analysis if no participant is attributed a probability greater than a predetermined threshold. For example, using voice profiles alone transcription module 130 may determine the probability that either participant A or participant B made a particular statement is 70% and 30%, respectively. If the maximum confidence level determined for a particular statement does not exceed the predetermined threshold, transcription module may perform additional analysis, such as analysis involving facial movement, in an attempt to increase the maximum confidence level.

In certain instances, a lower maximum confidence level may trigger transcription module 130 to enable human-assisted transcription. In this mode, a sound clip, a video clip, transcribed text, and/or other data corresponding to the statement may be presented to a human reviewer. The human reviewer may then be prompted to select the source of the statement from among all the participants of the videoconference or from a subset of participants selected by the transcription module.

In step 212, a transcription output is generated that identifies statements of the videoconference and respective sources for those statements. The transcription output may be in any suitable form including, for example, in printed form and/or in computer-readable form. Certain computer-readable forms may be suitable for downloading, printing, performing a text-based search, for wireless or wireline transmission, and/or for storage in computer-readable media.

Figure 3:
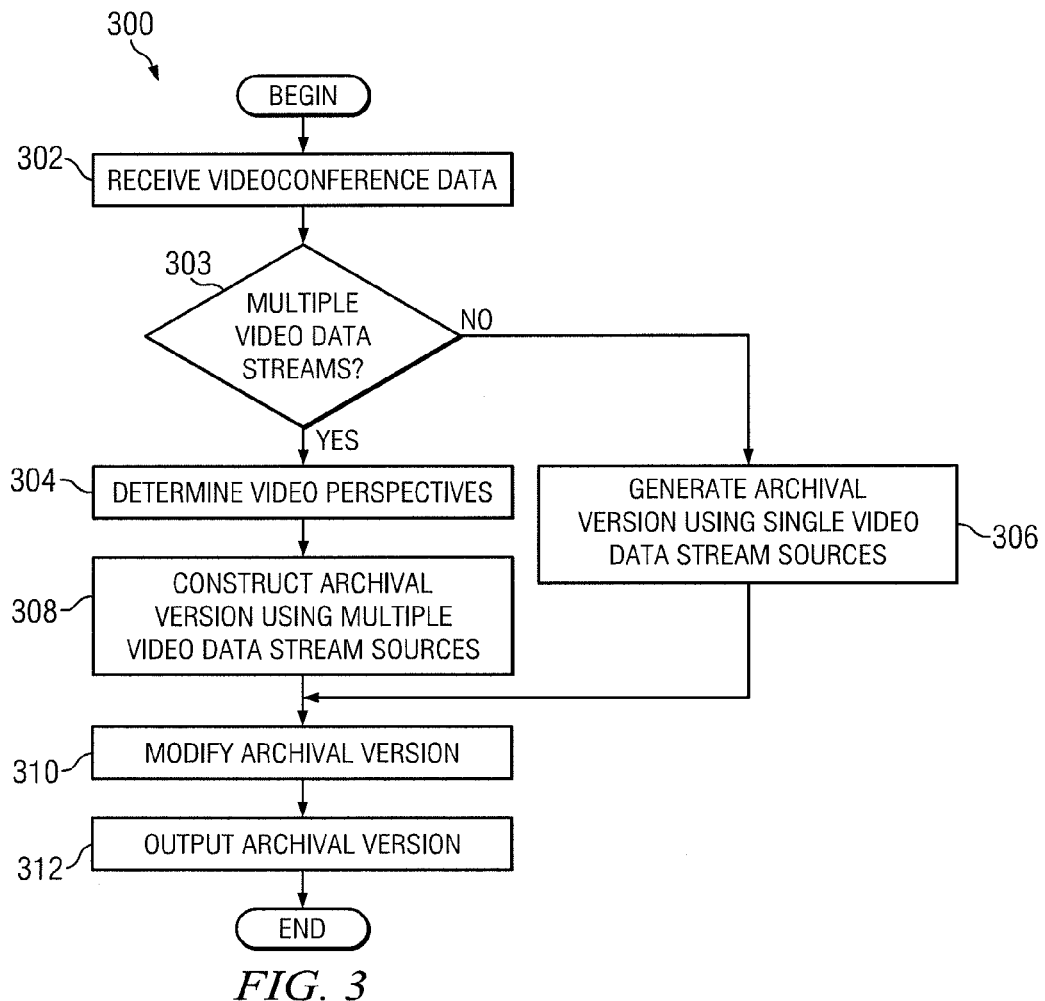
FIG. 3 is a flowchart illustrating a method for generating an archival version of audio and visual data of a videoconference.

FIG. 3 is a flowchart 300 illustrating a method for generating an archival version of audio and visual data of a videoconference. For particular videoconferences, audio and/or visual data may be recorded from multiple, differing perspectives that are synchronized together. For example, each client 110 used to facilitate a videoconference may be configured to record one or more respective audio and/or video data streams during the videoconference. In certain embodiments, video editor 140 may use a variety of computer-implemented rules to generate a master archival audio-video data stream that switches between the different available audio and/or visual perspectives recorded during the videoconference. The master archival audio-video data stream generated by video editor 140 may be sufficiently representative of the videoconference, such that it may not be necessary to also archive all of the available audio and/or visual perspectives used to generate the archival version. The master archival audio-video data stream may be sufficiently representative so that people later trying to understand what happened at a video conference may not need to refer back to the original 'raw footage'.

In step 302, data regarding the videoconference is received. In various embodiments, the data may be received in a manner substantially similar to certain examples described previously with reference to step 202 of FIG. 2. If video editor 140 determines in step 303 the data received in step 302 includes multiple, synchronized video data streams of the videoconference recorded from different visual perspectives, flowchart 300 proceeds to step 304; otherwise, an archival version of the videoconference is generated in step 306 using the single video data stream recorded for the videoconference.

In step 304, video editor 140 may determine which perspective or combination of perspectives of multiple, synchronized video data streams to include in each sequence of temporally-ordered video frames of the archival version of the videoconference. Any of a variety of criteria may be used in making the determination. For example, the determination for any given video frame may be based on which videoconference participant is speaking, which participant is the next to speak, which participant is considered the most important speaker during a video frame when multiple participants are speaking at once, any combination of the preceding, or other suitable criteria.

If the criterion in step 304 is based in part on who is speaking during a video frame, video editor 140 may determine who is speaking during the video frame using data generated by transcription module 130. In an alternative embodiment, video editor 140 may make a determination as to who spoke during a particular video frame in a manner substantially similar to that described previously with reference to step 210 above.

In particular instances, video editor 140 may select in step 304 a combination of perspectives for a particular video frame sequence. For example, video editor 140 may edit two different video data streams into a combined, split-screen video frame sequence in response to a determination that multiple participants are speaking at once, in response to a determination that multiple participants are speaking in rapid succession, and/or in response to a determination that the viewers' interests would be best served by utilizing this format for any reason (including making non-verbal responses visible).

Figure 4:
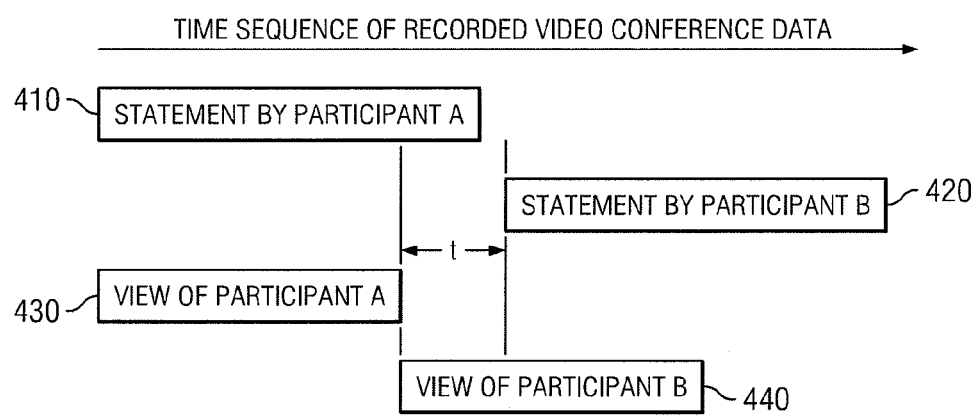
FIG. 4 illustrates the use of a time sequence of data recorded during a videoconference.

In certain embodiments, video editor 140 may edit in step 304 a particular video sequence of the archival version of a videoconference in a manner that shows a view of one or more participants at moments during the videoconference when another participant was speaking. As shown in FIG. 4, for example, system 100 may determine from recorded videoconference data that participant A made a statement during a first time sequence 410 and that participant B made the next statement during a subsequent time sequence 420 of the recorded videoconference. Based at least in part on this determination, video editor 140 may transition the view of the archival version of the videoconference from a view 430 of participant A to a view 440 of participant B before time sequence 410 terminates (i.e. while participant A was speaking) and before time sequence 420 begins (i.e. before participant B spoke the next statement). As shown in FIG. 4, t represents the time interval during which the archival version of the videoconference will show a view of participant B while participant B is not speaking.

As another example of intelligent processing, system 100 may choose which participant to show during a recorded timeframe when participant A and participant B spoke simultaneously. The decision may be based, for example, on a determination of which speaker is more important and/or a determination of which speaker is speaking more on topic. In certain instances, there may be a time gap between a statement made by participant A and a subsequent statement made by participant B. System 100 may be configured to show both participant A and participant B during the gap time period, or the gap time period can be split with some time showing participant A and some time showing participant B. As yet another example of intelligent processing performed in step 304 that may result in not showing a view of a participant while the participant spoke, a time sequence of recorded videoconference data may correspond to a longer statement or a series of statements spoken by a particular participant that is intermittently interrupted by short statements, verbal acknowledgements, or other sounds (e.g., laughter, coughing, shuffling, etc.) made by other participants. Video editor 140 may determine those types of short or intermittent interruptions are not significant enough to switch the perspective away from the more important participant speaking the longer statement or series of statements. This type of intelligent decision making may be contrasted with alternative systems that switch the perspective of a video stream based on sound sources alone, which may result in choppy and visually irritating video cuts.

In still another example of intelligent processing performed in step 304 that may result in not showing a view of a participant while the participant spoke during the videoconference, video editor 140 may analyze semantics of the videoconference transcription to intelligently determine which view or combination of views of the videoconference to use during a particular time sequence when multiple participants are speaking at once. For example, video editor 140 may search the multiple statements for key words spoken with particular frequency during the videoconference to determine who is speaking on topic and who is having an aside about something unrelated to the subject matter of the videoconference. Thus, system 100 may look at the meaning of statements made during the videoconference to intelligently select which view or combination of views to use. Statistical analysis, human-specified agendas, and/or other input may be used to assist in identifying various key words that may be considered on topic for a particular videoconference. This type of intelligent decision making may be contrasted with alternative systems that switch the perspective of a video stream based merely on who is talking at any given point in time.

Semantic analysis may also be performed in step 304 to determine which time sequences of the recorded videoconference data to include and which to discard in an archival version of the videoconference that is limited to highlights. Such processing may be effected by removing portions of the recorded videoconference data that are semantically unrelated to key words as determined in a manner substantially similar to that discussed above. In certain embodiments, system 100 may receive input from a viewer-user and create a customized archival version of the videoconference that is limited to particular highlights associated with the input specified by the viewer-user.

In step 308, video editor 140 may construct an archival version of the videoconference based at least in part on the determinations made in step 304. In step 310, video editor 140 may modify the archival version constructed in step 308 based on input received from one or more users. In step 312, the constructed archival version of the videoconference may be outputted in a manner that may be suitable for downloading, printing, performing a text-based search, for wireless or wireline transmission, and/or for storage in computer-readable media.

The archival version may include many types of metadata associated with various views and time points of the videoconference. These may include who is speaking when, keywords associated with different periods of the conference, gestural and emotion analysis of participants, and so on. Portions of this metadata may be derived using computations based upon the explicit spoken content of the videoconference. Other portions may be derived from temporal dynamics of the interactions and nonverbal communications that the system may be able to note and/or interpret.

In certain embodiments, video editor 140 may use a variety of computer-implemented rules to construct the audio portion of an archival version of a videoconference in addition to the video portion. For example, video editor 140 switch between differing recorded audio perspectives based on which audio data stream has the highest fidelity or quality at any given point in time. Any of a variety of factors may influence the quality of portions of an audio data stream. For example, a microphone directly recording human speech of a participant may produce better audio quality than that produced by a microphone recording the same human speech as produced by a speaker. As another example, video editor 140 may switch to the audio data stream with the least noise anomalies, independent of who is speaking.

Modifications, additions, or omissions may be made to the systems and apparatuses disclosed herein without departing from the scope of the invention. The components of the systems and apparatuses may be integrated or separated. For example, network 120 may include transcription module 130 and/or video editor 140. Moreover, the operations of the systems and apparatuses may be performed by more, fewer, or other components. For example, the operations of a particular client 110 and transcription module 130 may be performed by one component, or the operations of transcription module 130 and/or video editor 140 may be performed by more than one component. In addition, one or more forms of logic may be configured to perform the operations of both transcription module 130 and video editor 140. Operations of the systems and apparatuses may be performed using any suitable logic comprising software, hardware, and/or other logic.

Modifications, additions, or omissions may be made to the methods disclosed herein without departing from the scope of the invention. The methods may include more, fewer, or other steps. Additionally, steps may be performed in any suitable order, steps sequences may loop, and certain steps may be repeated. For example, a user profile may be opened in step 204 before data is received in step 202.

A component of the systems and apparatuses disclosed herein may include an interface, logic, memory, and/or other suitable element. An interface receives input, sends output, processes the input and/or output, and/or performs other suitable operation. An interface may comprise hardware and/or software. Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for generating a transcription of a videoconference, comprising:
    matching human speech of a videoconference to writable symbols, the human speech encoded in audio data of the videoconference;
    determining a probability that a portion of the human speech matches a profile of a participant of a plurality of participants of the videoconference, the profile stored in tangible computer-readable memory;
    if the probability is less than a predetermined threshold, using video data of the videoconference to determine which participant of the plurality of participants of the videoconference is the most likely source of the portion of the human speech; and
    generating a transcription of the videoconference that identifies an association of the portion of the human speech and the participant of the plurality of participants of the videoconference determined to be the most likely source of the portion of human speech.

2. The method of claim 1, wherein the profile comprises voice profile data of the participant of the plurality of participants of the videoconference.

3. The method of claim 1, wherein the profile comprises visual profile data of the participant of the plurality of participants of the videoconference.

4. The method of claim 1, further comprising generating at least a portion of the profile during the videoconference.

5. The method of claim 1, further comprising generating at least a portion of the profile before the videoconference begins.

6. The method of claim 1, further comprising generating at least a portion of the profile after the videoconference has terminated.

7. A non-transitory computer-readable memory storing logic, the logic operable when executed by one or more processors to:
    match human speech of a videoconference to writable symbols, the human speech encoded in audio data of the videoconference;
    determine a probability that a portion of the human speech matches a profile of a participant of a plurality of participants of the videoconference, the profile stored in tangible computer-readable memory;
    if the probability is less than a predetermined threshold, use video data of the videoconference to determine which participant of the plurality of participants of the videoconference is the most likely source of the portion of the human speech; and
    generate a transcription of the videoconference that identifies for each statement the determination of which participant of the plurality of participants of the videoconference is most likely the source of the statement.

8. The non-transitory computer-readable memory of claim 7, wherein the profile comprises voice profile data of the participant of the plurality of participants of the videoconference.

9. The non-transitory computer-readable memory of claim 7, wherein the profile comprises visual profile data of the participant of the plurality of participants of the videoconference.

10. The non-transitory computer-readable memory of claim 7, wherein the logic is further operable when executed by the one or more processors to generate at least a portion of the profile during the videoconference.

11. The non-transitory computer-readable memory of claim 7, wherein the logic is further operable when executed by the one or more processors to generate at least a portion of the profile before the videoconference begins.

12. The non-transitory computer-readable memory of claim 7, wherein the logic is further operable when executed by the one or more processors to generate at least a portion of the profile after the videoconference has terminated.

13. A method for generating a transcription of a videoconference, comprising:
    matching human speech of a videoconference to writable symbols, the human speech encoded in an audio data stream of the videoconference;
    determining a probability that a portion of the human speech matches a voice profile of a participant of a plurality of participants of the videoconference, the voice profile stored in tangible computer-readable memory;
    if the probability is less than a predetermined threshold, using video data of the videoconference to determine which participant of the plurality of participants of the videoconference is the most likely source of the portion of the human speech, the video data corresponding to the portion of the human speech; and
    generating a transcription of the videoconference that identifies an association of the portion of the human speech and the participant of the plurality of participants determined to be the most likely source of the portion of the human speech.

14. The method of claim 13, further comprising generating the voice profile using the audio data stream of the videoconference.

15. The method of claim 1, wherein the profile comprises a location of the participant.

16. The method of claim 1, wherein the profile comprises an address of the participant.

17. The non-transitory computer readable memory of claim 7, wherein the profile comprises a location of the participant.

18. The non-transitory computer readable memory of claim 7, wherein the profile comprises an address of the participant.

19. The method of claim 13, wherein the voice profile comprises a location of the participant.

20. The method of claim 13, wherein the voice profile comprises an address of the participant.

* * * * *